Sept. 2, 1924.

B. F. WALKER ET AL 1,507,533

MIXING VALVE

Filed Aug. 29, 1923

WITNESSES
Frederick Diehl.
Robert J. Hubsizer.

INVENTORS
Ben F. Walker
William J. Harper
BY Munn Co
ATTORNEYS

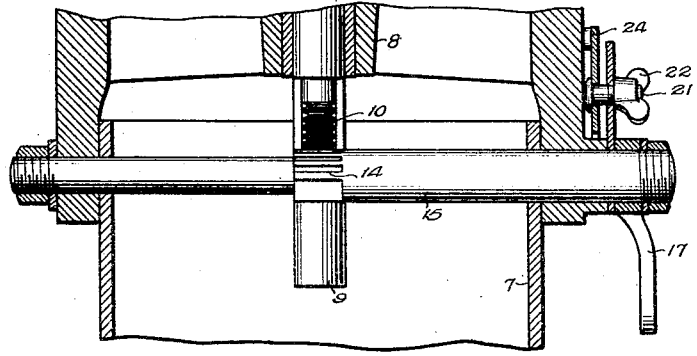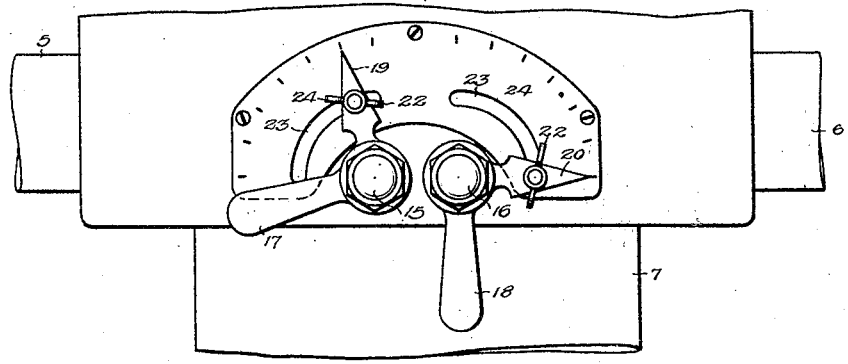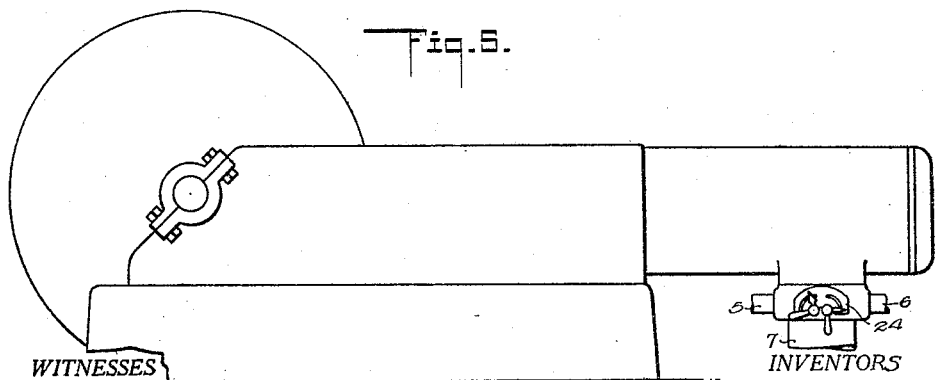

Patented Sept. 2, 1924.

1,507,533

UNITED STATES PATENT OFFICE.

BEN FRANKLIN WALKER AND WILLIAM JASPER HARPER, OF BAXTER SPRINGS, KANSAS.

MIXING VALVE.

Application filed August 29, 1923. Serial No. 660,021.

*To all whom it may concern:*

Be it known that we, BEN F. WALKER and WILLIAM JASPER HARPER, citizens of the United States, and residents of Baxter Springs, in the county of Cherokee and State of Kansas, have invented a new and Improved Mixing Valve, of which the following is a full, clear, and exact description.

This invention relates to a mixing valve construction, and has for an object the provision of means whereby the admission of air and fuel to an engine can be very simply and easily controlled.

Another object concerns the provision of means whereby quick and easy adjustments can be made to vary the amount of fuel and air admitted to the cylinder of the engine under a given suction produced by the engine.

A further object concerns the provision of means whereby in the adjustment of the parts to vary the proportions of the air and fuel the setting of the parts can be readily observed from the exterior of the engine.

A still further object concerns the provision of means whereby the construction and operation of the device is to the greatest extent simple, requiring substantially no care and attention with respect to repairs.

The invention is illustrated in the drawings, of which—

Fig. 3 is a section on the line 3—3 of Fig. 2;

Fig. 4 is a detail elevation of the means whereby the setting can be effected from the exterior of the engine; and Fig. 5 is a side view of an engine with the mixing valve device disposed thereon.

Figure 1:
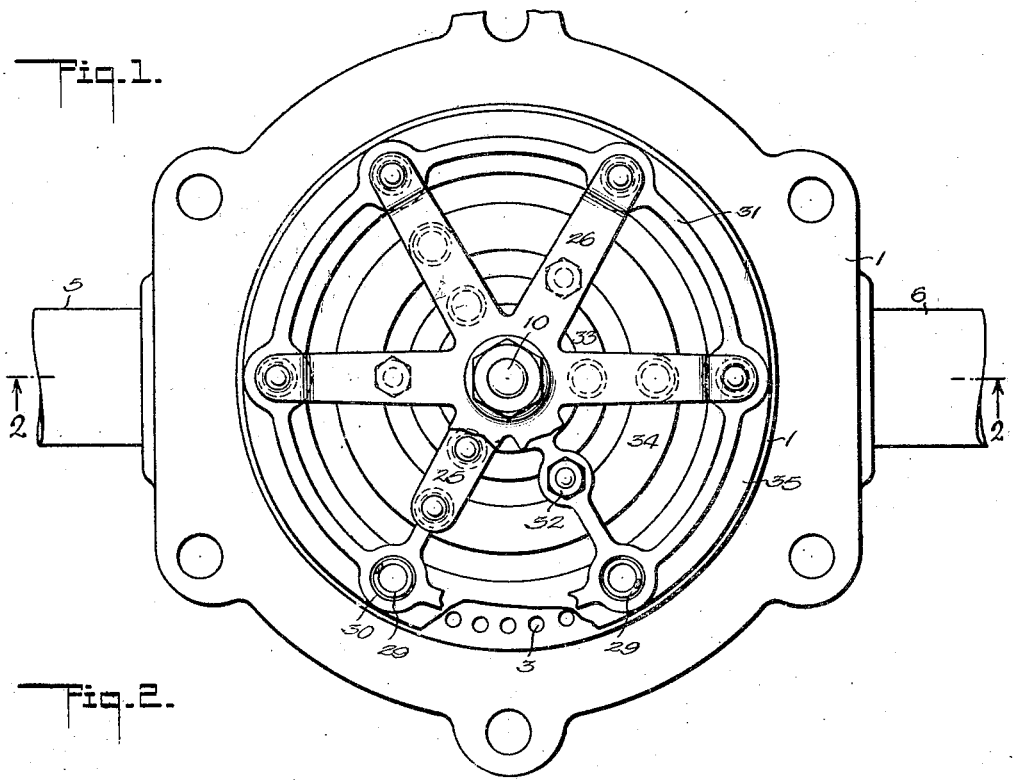
Figure 1 is a plan view of the valve casing with the valve and its co-operating parts in place.

The form of the invention shown in the drawings is a preferred form, although it is understood that modifications in the construction and arrangement of the parts and in the character of the materials used may be adopted without departing from the spirit of the invention.

In the general conception of the invention, we desire to provide a valve casing in which are a plurality of air and fuel ports normally closed by valve elements which tend to be held closed by a spring member. We also contemplate being able to selectively regulate the tension of these springs for any given suction of the engine so that the proportion of air and fuel can be varied at will. To this end we provide mechanical connections between certain or all of the springs and extending to the exterior of the engine, so that by adjusting one or more of these connections one or more springs or groups of springs have their tension varied, whereby a given suction of the engine will cause the opening of a different number of valves in accordance with the setting. We provide means adapted to be set and adjusted on the exterior of the engine so that the relative proportion of air and fuel can be observed by observing the setting of the device located on the exterior of the engine.

As shown more specifically in the drawings, which illustrate the preferred form of the invention, we have provided a valve casing 1 in which are located a plurality of air ports 2 and a plurality of fuel inlet ports 3. This casing is disposed against an engine casing or wall 4 and is provided with fuel inlet pipes 5 and 6 and an air inlet pipe 7. This casing is also provided with a central hub 8 through which a tubular member 9 and a shaft 10 are adapted to slide. The tubular member is provided with a rack element 11 thereon, and the shaft 10 is also provided with a rack element 12. With these rack elements gears 13 and 14 are respectively adapted to mesh, these gear elements being mounted on shafts 15 and 16 extending through the casing to the exterior thereof and having on their ends handles 17 and 18 and indicating pointers 19 and 20. These pointers are provided with openings through which the ends of bolts 21 extend. The ends of these bolts are adapted to receive wing nuts 22. The shanks of these bolts are adapted to pass through slots 23 in a plate 24 fastened against the valve casing so that after the handles 17 and 18 have been set the wing nuts can be tightened to hold them in this position.

Figure 2:
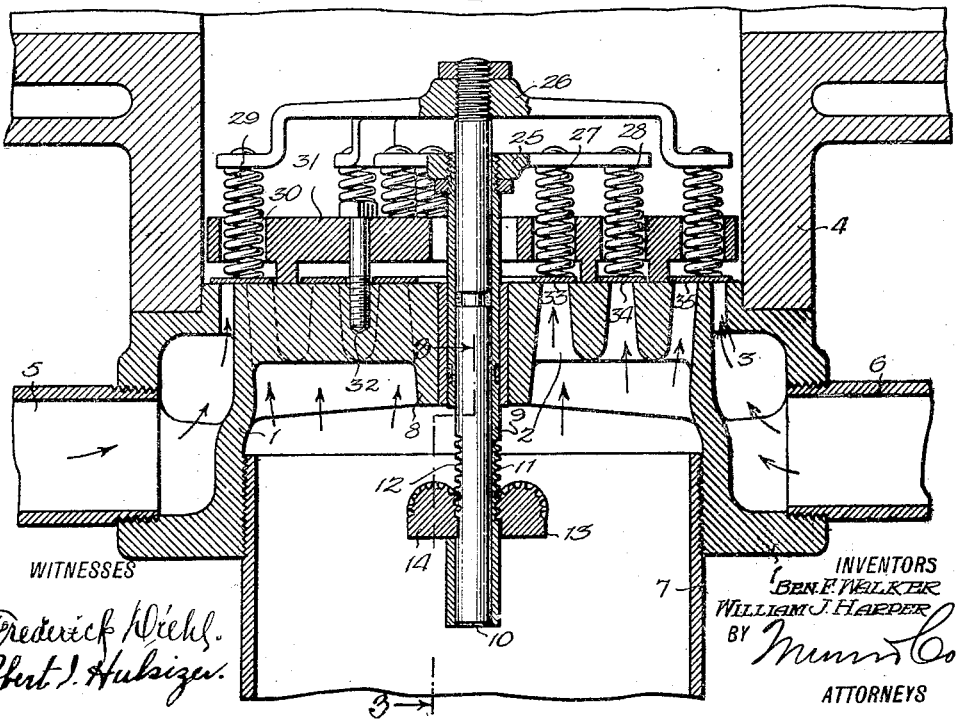
Fig. 2 is a section on the line 2—2 of Fig. 1.

On the upper end of the tubular member 9 is supported a spider 25 having three arms preferably extending from the tubular member at equal intervals therearound. At the upper end of the shaft 10 there is disposed another spider 26 having six arms extending therefrom at equal intervals. Beneath each of the three arms of the spider 25 there are disposed springs 27 and 28, and beneath each of the arms of the spider 26 there is disposed a spring 29. These springs are adapted to extend downwardly through suitable openings such as 30 in a plate 31 which is fastened to the upper surface of the valve casing 1 by means of bolts such as 32. This plate 31 is provided with the openings 30 merely to guide the springs and keep them in their proper position. The lower ends of these springs are adapted to bear against a plurality of valve plates. For instance, the springs 27 and 28 are adapted to bear against valve rings or plates 33 and 34, respectively, and the springs 29 are adapted to bear against a valve ring or plate 35. These valve plates 33, 34 and 35 are disposed, the first two over certain of the air inlet ports, and the last over not only certain of the air inlet ports but also over the fuel inlet ports. It will be readily observed that the position of the respective spiders in a vertical direction, when considering Fig. 2, will determine the extent to which the springs under the spider will bear against the valve plate and, therefore, the forces of suction of the engine necessary to lift the valve plates against the action of these springs. In view of the fact that the tubular member 9 and the shaft 10 are instantly operable, it will be observed that certain of the air ports and the fuel ports can be independently controlled by selectively varying the tension of the springs holding the valve plates covering these ports in their normal positions.

Because of the fact that this valve mixing device can be set from the outside it is apparent that the position of the handle 17 will at once indicate the relative proportion of air and fuel which is being admitted to the engine, and will also be apparent that these handles can be locked in any desired position and maintained in proper adjustment.

What we claim is:—

A mixing valve construction which includes a valve casing having a plurality of air and fuel ports arranged in circular rows, a plurality of ringlike valve plates covering said ports, a plurality of springs bearing on said plates, an adjustable spider member adapted to engage with certain of said springs, a second adjustable spider adapted to engage with certain others of said springs, and means controlled by an operator exterior to the valve construction to adjust said spiders and selectively vary the pressure of the springs on said plates.

BEN FRANKLIN WALKER.
WILLIAM JASPER HARPER.